May 30, 1967
J. H. HOLLOWAY ETAL
3,323,008
ATOMIC BEAM APPARATUS WITH MEANS FOR RESILIENTLY
SUPPORTING ELEMENTS IN AN EVACUATED TUBE
TO PREVENT THERMAL DISTORTION
Filed Oct. 29, 1962
3 Sheets-Sheet 1
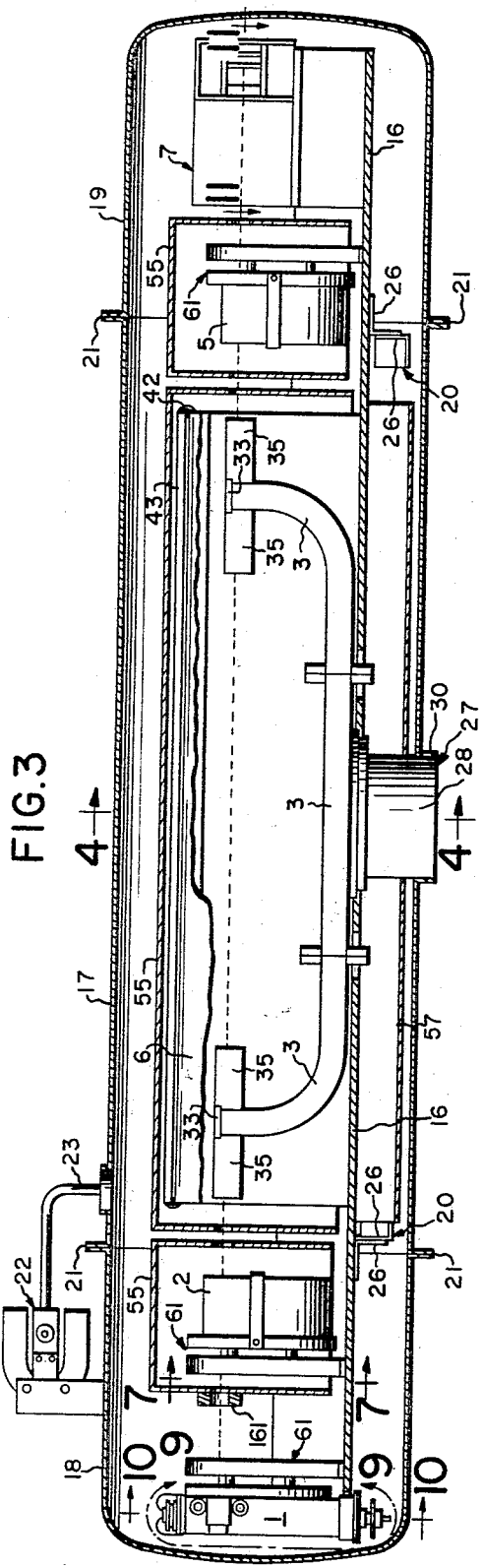
INVENTORS
JOSEPH H. HOLLOWAY
JOSEPH W. ANDERSON
BY *Harry E. Aine*
ATTORNEY

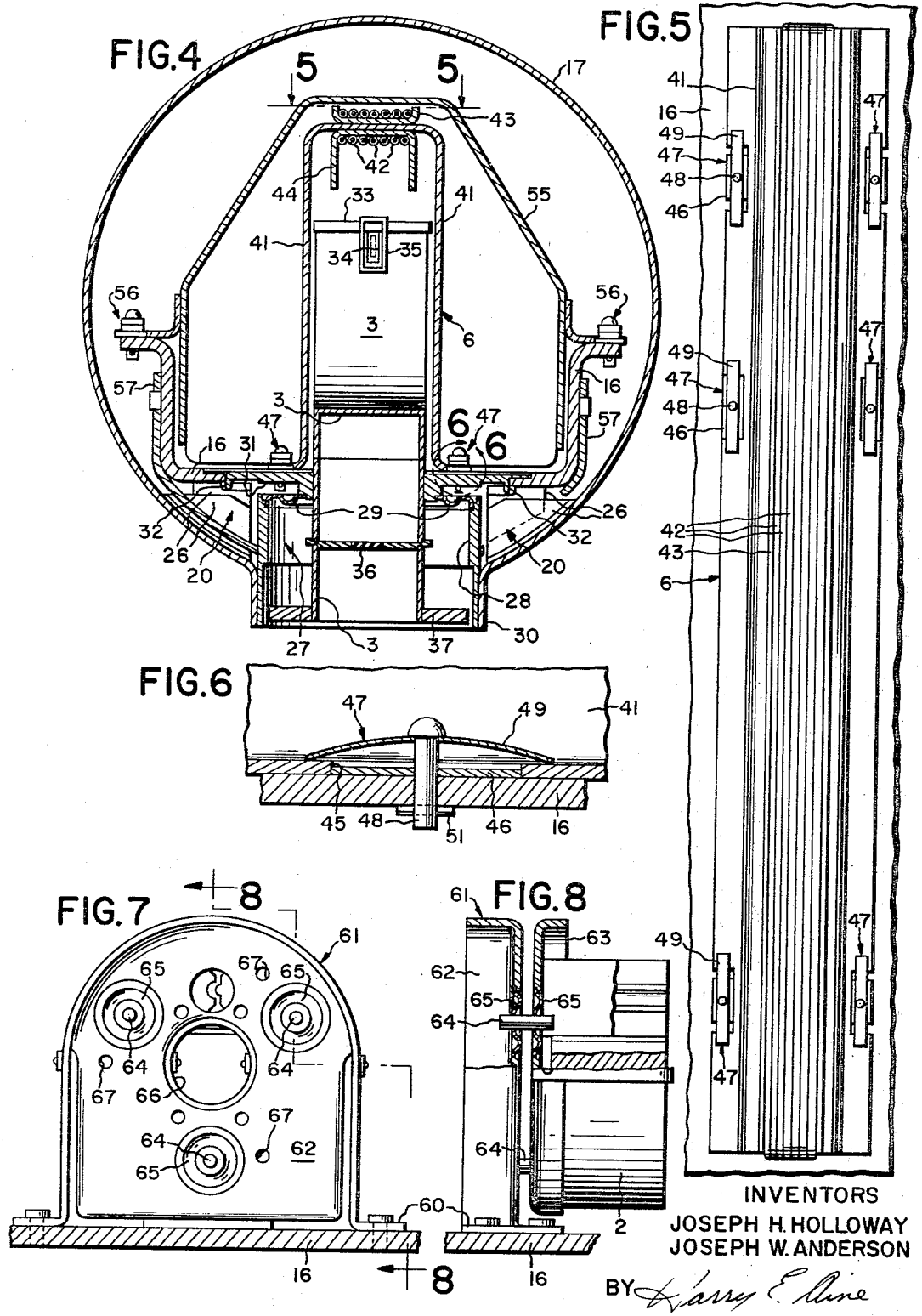

May 30, 1967
J. H. HOLLOWAY ETAL
3,323,008
ATOMIC BEAM APPARATUS WITH MEANS FOR RESILIENTLY
SUPPORTING ELEMENTS IN AN EVACUATED TUBE
TO PREVENT THERMAL DISTORTION
Filed Oct. 29, 1962
3 Sheets-Sheet 3
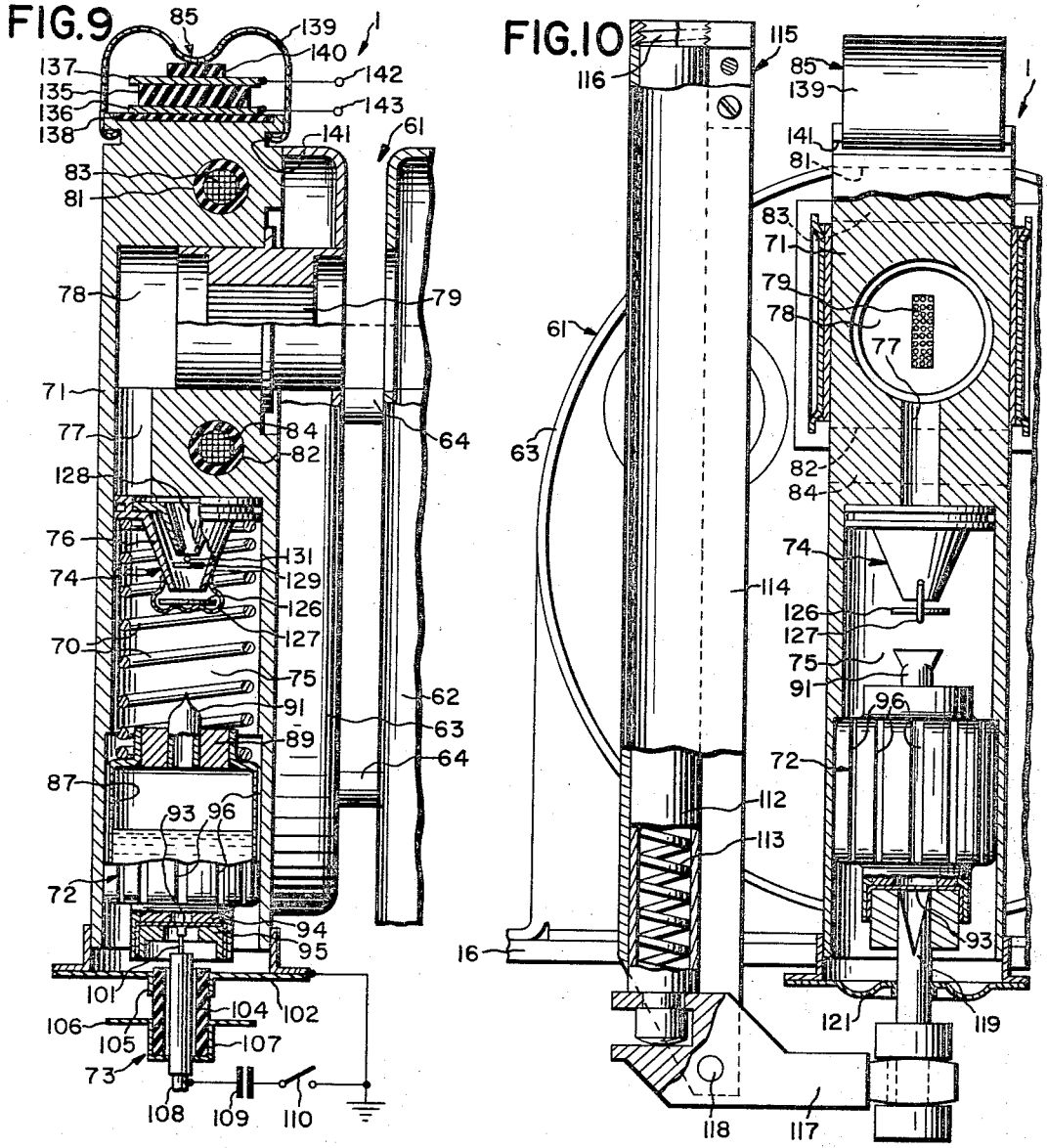
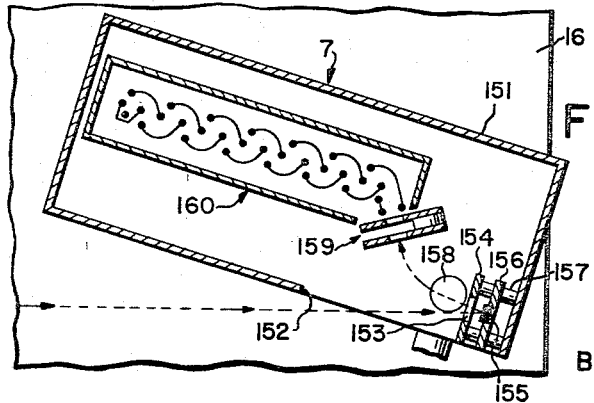
INVENTORS
JOSEPH H. HOLLOWAY
JOSEPH W. ANDERSON
BY *Harry E. Aine*
ATTORNEY United States Patent Office 3,323,008
Patented May 30, 1967

3,323,008
ATOMIC BEAM APPARATUS WITH MEANS FOR RESILIENTLY SUPPORTING ELEMENTS IN AN EVACUATED TUBE TO PREVENT THERMAL DISTORTION
Joseph H. Holloway, Topsfield, Mass., and Joseph W. Anderson, Manor, Pa., assignors, by mesne assignments, to Hewlett-Packard Company, Palo Alto, Calif., a corporation of California
Filed Oct. 29, 1962, Ser. No. 233,573
10 Claims. (Cl. 315—111)

The present invention relates in general to atomic beam apparatus and more particularly, to a self-contained, rugged, and portable atomic beam tube forming the basic reference element for an extremely stable frequency standard useful, for example, for precisely measuring or controlling time and/or frequency.

Fundamentally, atomic beam frequency standards detect resonance of atoms in a beam to obtain the standard frequency. Briefly, a beam of atomic particles, such as cesium atoms, is exposed to electromagnetic radiation in such a manner that when the frequency of the applied radiation is at the extremely precise and predetermined resonance frequency, the resonant beam particles are deflected into a suitable detector. The frequency of the applied radiation is modulated about the precise resonance frequency to produce a signal from the detector circuitry suitable for servo control. Control circuitry is then employed to lock the center frequency of the applied radiation to the resonance line.

The applied radiation is generally derived from a harmonic of a crystal oscillator. The output frequency of the oscillator can be made stable to 1 part in $10^{11}$ over the lifetime of the tube, which may be for at least two and possibly more years. An output can be had at almost any desired frequency by providing a suitable number of multiplier and divider stages operative upon the oscillator output signal.

Short-term stability is determined by the response time of the frequency control circuitry. Therefore, if stability is examined in periods of time shorter than the minimum servo-response time of the control circuitry, fluctuations characteristic of the short-term stability of the oscillator will be observed. Thus a complete specification of stability must include a statement of the observation time.

Heretofore, self-contained portable atomic beam tubes of the above-described type have been made but these devices have been characterized by a mechanical tube design which exposed the beam determining elements such as the beam source, state selector magnets, and their support structure to rapid changes in the ambient physical environment.

With such a design, changes in the pressure and temperature of the ambient atmosphere as well as tube mounting stresses produced sufficient distortion of the tube element supporting structure or drift in the temperature of the atomic particle source to render the output signal responsive to the physical changes. Typically the tolerances in the beam alignment are such that the beam tube components should not shift from their predetermined axis by an amount greater than ±0.002 inch over the length of the beam path, typically, to 2-5 feet in length. Also, the temperature of the atomic particle source should not shift more than 0.1° C.

In the present invention, the beam tube is isolated from the ambient environment in at least two ways. First the beam determining elements such as the beam source, support structure, and magnets are all disposed entirely within an opaque, evacuated vacuum envelope which is processed by baking during evacuation. The vacuum serves to isolate the beam determining elements from stresses such as those produced by changes in temperature and pressure which would otherwise have been transmitted to the beam determining elements through the atmosphere.

Secondly, the elongated support structure for supporting the beam determining elements is suspended in the vacuum envelope in such a manner that the tube mounting stresses are not transmitted directly to the beam determining elements.

Several severe problems are created by enclosing the beam determining elements within a separate vacuum envelope. First, the elements must maintain proper alignment after being subjected to the severe thermal shock of the exhaust and bakeout cycle. Second, the magnets (permanent and electromagnetic), atomic beam oven parts, including the atomic source ampule and temperature sensing device, and apparatus for opening the ampule, all disposed within the vacuum envelope, must withstand a prolonged high-temperature bakeout cycle of at least 350° C. without deleterious affect.

The principal object of the present invention is to provide a rugged, light-weight, portable, self-contained long lived atomic beam tube which is useful as a stable frequency standard in a moderate to severe environment.

One feature of the present invention is the provision of a tube construction wherein the atomic beam determining elements including, the atomic beam source, magnets, and beam detector are all contained in an evacuated and sealed vacuum envelope, whereby such elements are isolated, due to the vacuum, from rapid changes in the ambient surrounding atmosphere.

Another feature of the present invention is a novel support structure for the beam determining elements wherein the elements are carried from an elongated support structure suspended within an evacuated vacuum envelope, the suspension system providing an axial restraint for the support structure which is separate from spaced support points providing radial and torsional restraints, whereby off-axis distortion of the support structure, produced by thermal and mechanical shock, is minimized.

Another feature of the present invention is the provision of a novel configuration of spring fasteners and fixed indexing means for securing the C-field magnet to the support structure whereby the magnet is held in place during the bakeout cycle without introducing stresses in the magnet which would otherwise degrade the performance of the C-field magnet.

Another feature of the present invention is the provision of a gimbal support for supporting certain beam determining elements within the tube wherein the gimbal is comprised of a fixed bracket serving to carry an element mounting plate via axially directed rods extending between the bracket and plate, the rods being anchored in localized deformable portions formed on both the bracket and receiving plate, whereby adjustments may be made in alignment of certain of the beam determining elements carried upon the gimbal support.

Another feature of the present invention is the provision of an atomic beam material ampule made of certain materials which permit the ampule to be baked in the vacuum of the tube for prolonged periods of time, the ampule being further provided with a thin-walled portion which may be readily perforated for use when desired within an evacuated sealed vacuum envelope.

Another feature of the present invention is the same as the preceding feature wherein an ampule is opened within the evacuated tube by means of an electric discharge serving to evaporate a localized portion of the thin-walled portion of the ampule to allow escape of the atomic beam material from the ampule in use.

Another feature of the present invention is the provision of a mechanically operated, thermally actuated ampule opener wherein a knife is thermally actuated to cut through the thin-wall portion of the ampule for release of the atomic material in use.

Another feature of the present invention is the provision of a non-spillable atomic beam reservoir having a tapered, re-entrant vapor vent structure disposed well within the reservoir with the opening therein being above the liquid level, whereby spillage of liquid from the reservoir is eliminated but vapor is allowed to pass from the reservoir.

Another feature of the present invention is the same as the preceding feature including provision of a second similarly tapered hollow vent vapor vent structure disposed in spaced apart nested relationship within the first vent structure whereby the probability of spillage of liquid from the reservoir is greatly reduced while flow of liquid back into the reservoir from spaces between the nested structures is greatly facilitated.

Another feature of the present invention is the provision of a novel thermistor assembly carried upon the atomic oven and being made of a material and construction which permits baking in a vacuum for prolonged periods of time at temperatures of at least 350° C.

Other features and advantages of the present invention will become apparent upon a persual of the following specification taken in connection with the accompanying drawings wherein:

FIG. 1 is a schematic drawing of an atomic beam tube,

FIG. 2 is a schematic block diagram of an atomic beam tube as used for a frequency standard, FIG. 3 is a longitudinal view, partly in section, of the atomic beam tube of the present invention, FIG. 4 is an enlarged transverse cross-sectional view of the structure of FIG. 3 taken along line 4—4 in the direction of the arrows, FIG. 5 is an enlarged view of a portion of the structure of FIG. 4 taken along line 5—5 in the direction of the arrows, FIG. 6 is an enlarged cross-sectional view of a portion of the structure of FIG. 4 delineated by line 6—6 and rotated 90° for clarity, FIG. 7 is an enlarged detailed view of the gimbal support structure delineated by line 7—7 of FIG. 3, FIG. 8 is a side view, partly in cross-section, of the structure of FIG. 7 taken along line 8—8 in the direction of the arrows, FIG. 9 is an enlarged longitudinal cross-sectional view of a portion of the structure of FIG. 3 delineated by line 9—9, FIG. 10 is a transverse enlarged cross-sectional view of an alternative structure to that portion of the structure shown in FIG. 3 taken along line 10—10 in the direction of the arrows, and FIG. 11 is an enlarged cross-sectional view partly schematic of the structure of FIG. 3 taken along line 11—11 in the direction of the arrows.

Referring to FIGS. 1 and 2 a brief description of a cesium beam tube will be given. The interaction in the cesium atom which is involved occurs between the nuclear magnetic dipole and the magnetic dipole of the valence electron. As in the case of two ordinary bar magnets, the potential energy of the system depends on the relative or orientation of the magnetic dipoles. In nature, only two stable configurations of the cesium atom exists, those in which the dipoles are parallel or anti-parallel, corresponding to two allowed quantum states. To change from one state to the other, an amount of energy equal to the difference in energy of orientation must be either given to or taken from the atom. Since all cesium atoms are identical, E is the same for every atom. A convenient way to supply the energy is by means of microwave radiation of frequency $f$, where $f$ is related to E through the Planck equation. $E = hf$, where $h$ is Planck's constant. No other frequency will cause a transition. Thus, $f$ is the resonance frequency associated with cesium.

To make use of the resonance, one makes use of the fact that the direction of the force experienced by a cesium atom in a strong inhomogeneous magnetic field depends on the state of the atom. Atoms in one state will be deflected into stronger fields and atoms in the other state will be deflected into weaker fields. Thus, magnets can be used for state selectors for a beam of cesium atoms.

A beam of atomic particles, equally populated by atoms of both states, is produced by the cesium beam source 1, hereinafter referred to as the oven. Atoms of one state with either parallel or antiparallel alignment of the electron and nuclear magnetic dipoles, are selected by a first state selector magnet 2 or A-field magnet and are deflected through a microwave structure 3 powered from a microwave generator 4 and thence through a second state selector magnetic field hereinafter referred to as the B-field produced by state selector magnet 5. A weak uniform magnetic field is applied over the central region of the beam path in the presence of the microwave magnetic field by means of a suitable electromagnetic 6 hereinafter referred to as the C-field magnet. The field strength in the C-field region is approximately $\frac{1}{20}$ of a gauss to afford some separation between the energy sublevels of the atom. The C-field intensity is controlled to 3% to realize a frequency accuracy of 1 part in $10^{11}$.

If the frequency of the microwave oscillating field equals the resonance frequency, the atom changes states and is subsequently deflected into a detector target 7. Otherwise the atom does not change state and follows a trajectory which misses the detector 7. Hence presence of an atom current of the detector 7 indicates the signal frequency injected via generator 4 was equal to the resonance frequency, which in the case of the cesium atom is about 9,192.631770 megacycles.

The frequency of the generator 4 is modulated about its center frequency by provision of a modulation generator 8 serving to modulate the microwave generator 4 at a suitable low frequency or audio frequency rate of 100 cps. thereby modulating the output atom current at detector 7 at this frequency. The detector output signal may then be fed to the vertical plates of an oscilloscope 9 and displayed as a function of the modulation generator frequency applied to the horizontal plates of the oscilloscope 9 to produce the characteristic resonance line signal.

The cesium beam tube acts as a passive resonator with a maximum response at the cesium resonance frequency and a Q typically between $10^7$ and $10^8$.

To lock an oscillator to the resonance, a system as shown in FIG. 2 is employed. More specifically, output of the atomic beam tube 10 is fed to suitable control circuits 11 to produce a suitable error output signal which is applied to a controlled crystal oscillator 12 which is precisely controlled by the error signal to maintain the microwave frequency applied to the tube 10 via a suitable frequency multiplier chain 13, at the resonance frequency. Multiplier chain 13 and the controlled oscillator 12 form the microwave generator 4.

An output signal is derived from the controlled oscillator 12 at terminal 14. An output at any desired frequency may be synthesized from the output signal at terminal 14. Either output signal is stable to 1 part in $10^{11}$ for the lifetime of the atomic beam tube 10.

The novel vacuum enclosed tube construction of the present invention will be described in greater detail with reference to FIGS. 3 and 4. The beam determining elements including the oven 1, state selector magnets 2 and 5, the C-field magnet 6, microwave structures 3, and detector 7, are all fixedly secured in an axially spaced apart relation to an axially directed unitary support channel 16. In a typical example, the channel 16 is approximately 25 inches in length with approximately 1 inch upright side walls and made of strong non-magnetic material such as $\frac{1}{8}$ inch thick 304 stainless steel. The channel 16 is made approximately 3 inches wide at the base.

A three piece tubular vacuum envelope is formed by hollow cylindrical center section 17 and outwardly domed end hats 18 and 19, respectively. The tubular envelope structure is relatively rigid and is approximately 5 inches in diameter and made of approximately 1/32 inch thick 304 stainless steel sheet. The tubular sections 17, 18 and 19 are joined together and vacuum sealed at their outwardly directed mating flange portions 21. The sections are sealed by heliarc welding together at their outer ends. The vacuum is maintained by electrical getter ion vacuum pump 22 which continuously pumps the vacuum envelope in use via an exhaust tubulation 23.

The pump 22 serves to maintain a vacuum of approximately $10^{-7}$ mm. Hg during operation of the device to allow the beam atoms to pass from the source 1 to the detector 7 with extremely small probability of suffering a collision with a gas atom.

This particular vacuum envelope and tube construction wherein the beam determining elements are enclosed within and suspended from a separate vacuum envelope is especially advantageous since it serves to isolate the beam determining elements from the ambient environment. Rapid changes in the environment such as those produced by changes in temperature and pressure are not directly transmitted to the beam determining elements whereby the elements are rendered substantially non-responsive to such rapid changes in the environment. In addition, the surrounding vacuum envelope being of relatively rigid construction serves to protect the beam determining elements from physical abuse which otherwise would tend to destroy the proper alignment of the apparatus. The transverse alignment of the beam determining elements is preferably maintained to ±0.002 inch over the beam path length of approximately 25 inches.

The beam support channel 16 is suspended within the vacuum envelope by a suspension structure which provides an axial restraint substantially separate from a combined torsional and radial restraint. More specifically, torsional and radial restraints are provided by two pairs of axially and transversely spaced tab assemblies 20 disposed inbetween the channel 16 and the center section 17 of the vacuum envelope. The tab assemblies 20 are each comprised of two quadrant shaped right angle brackets 26 carried on the channel 16 and center section 17 as by spot welding. The individual bracket members 26 are disposed in abutting relationship with their planes being approximate at right angles to the tube axis and are fastened together by spot welding and heliarc welding at their radially directed peripheral edge portions. The bracket members 26 are made of relatively thin material, as, for example, 1/32 inch, 304 stainless steel metal.

By positioning the plane of the bracket members 26 substantially in the transverse plane of the tube structure and by making them of relatively thin material very little in the way of axial restraint is provided for the channel 16. In this manner channel 16 may readily expand and contract in the axial direction without introducing distortion in the channel 16. On the other hand, the tabs 26 at 25 provide a rigid support in the transverse plane to prevent torsional and radial distortion of the channel 16.

Axial restraint for the beam support channel 16 is provided via the intermediary of a centrally disposed support structure 27. The central support structure includes a hollow cylindrical member 28, as of 0.080 inch wall 304 stainless steel. The cylinder 28 is fixedly carried from the vacuum envelope 17 by being centered within a circularly pulled out sleeve portion of the envelope, the pulled out portion forming an outwardly directed cylindrical flange 30. The cylinder 28 and the flange 30 are fixedly secured and sealed together as by heliarc weld.

The cylinder 28 is radially inwardly directed from the center envelope section 17 and is fixedly secured to the channel 16 in the axial direction via the intermediary of a relatively thin-walled annular diaphragm 29 as of, for example, 403 Monel which is both non-magnetic and readily bakeable. The diaphragm 29 readily deflects in the radial direction but has great strength in the axial direction of the tube which is in the plane of the diaphragm. The diaphragm is approximately 0.010 inch thick. The inner periphery of the annular diaphragm 29 is fixedly secured as by brazing to a radially directed shoulder of a disc 31 which is fixedly carried from the channel 16 as by riveting a skirt portion 32 of the disc over the inside shoulder of an opening in the base of the channel 16.

An "X" band waveguide structure 3 passes through a rectangular central opening in the disc 31 and is brazed thereto to form a vacuum tight seal. The waveguide structure 3 is provided with a "T" section for dividing the microwave power into the arms of the "T" extending in the axial direction of the tube and bending up to terminate at transversely directed conductive walls 33 closing off and shorting the ends of the "X" band guide 3 to form a waveguide cavity resonator.

The shorted end portions of the waveguide 3 are provided with rectangular openings in opposite walls of the guide in axial alignment with the beam path. Short sections of the smaller "K" band guide 35 are fixed to the "X" band guide in axial alignment with the beam path and in registry with the rectangular openings. The "K" band guide sections 35 are cut off to the applied "X" band microwave power and thereby prevent escape of wave energy through the beam openings 34 into the spaces between the axially spaced cavity sections.

A conventional vacuum tight window 36 is brazed across the "X" band guide 3 near an input flange 37 thereby completing the vacuum envelope.

The C-field is provided by a C-field electromagnet 6 formed by an elongated U-shaped channel member 41. The channel member 41 is made of a good magnetic permeable material as of, for example, mumetal and is approximately 0.060 inch thick. The C-field magnet 6 is energized by a C-field coil 42 wound around the base of the channel 41 in the axial direction and retained in position by a pair of oppositely directed non-magnetic channel members 43 and 44 respectively, secured to the C-field magnet channel 41 as by spot welding. The C-field coil is made up of relatively few turns such as, for example, seven turns of 16 mil wire supplied with a relatively low D.C. current as of 20 milliamperes to produce the low uniform C-field of approximately 1/20 gauss. The coil 42 is preferably made of a non-magnetic material such as, for example, tantalum wire.

A woven glass insulating sleeve is threaded over the C-field coil wire such that adjacent turns of the C-field coil are insulated from each other and from the support channels 43 and 44, respectively. The glass sleeving permits the coil to be baked for prolonged periods at 350° C. or more in the vacuum.

Spring loaded fasteners and specially placed indexing devices (see FIGS. 5 and 6) serve to hold and position the U-shaped C-field magnet channel 41 to the support channel 16, in the desired position, while permitting relative expansion and contraction of the magnet 6 relative to the support without introducing localized stresses which would otherwise produce undesired C-field gradients. More specifically, three pairs of rectangular notches 45 have been cut out of the outwardly flared lip of the U-shaped C-field channel 41. Three pairs of rectangular indexing blocks 46 as of 0.030 inch thick stainless steel are fixedly secured to the base of the support channel 16 as by, for example, spot welding. The indexing blocks 46 register with the notches 45 to properly position the C-field magnet 6 with respect to the channel 16. The central pair of indexing blocks 46 register on three sides with the corresponding central pair of notches 45 thereby fixedly registering the central portion of the C-field magnet to the support channel 16. The remaining two pairs of indexing blocks 46 register with the notches 45 only along the inner edges of the blocks 46 whereby the C-field magnet is free to expand and contract in the axial direction relative to the blocks 46 and channel 16. Spring fastening assemblies 47 shown in greater detail in FIG. 6 are then employed to hold the C-field magnet 6 to the channel 16.

The spring biased fastening assemblies 47 are comprised of a pin 48 passing through aligned openings in a leaf spring 49, index block 46 and the support channel 16. A second small pin 51 passes through a transverse hole in the pin 48 and captures and fastens the components together. Elements of the spring fastener 47 are dimensioned such that the spring tension is selected to hold the various elements together sufficiently rigidly to prevent movement of the elements due to vibration while readily permitting axial contraction and expansion of the C-field channel 41 relative to the support channel 16 during the sleeve thermal shock encountered in the bakeout cycle. In this manner, excessive stress of the C-field magnet is avoided which otherwise would cause undesired gradients in the C-field.

A plurality of similarly U-shaped magnetic shield members 55 (see FIGS. 3 and 4) cover over the C-field magnet 6, A-field magnet 2, and the B-field magnet 5, respectively. Shields 55 are carried from the lip of the upright portions of channel 16 by a plurality of suitable spring loaded fastening devices 56. Shields 55 are made of a suitable magnetic permeable material such as, for example, Allegheny 4750 alloy, made relatively thin as, for example, 0.050 inch thick. The U-shaped channel shield members 55 are closed off at their ends via apertured transverse header members of the same material.

A magnetic permeable shield 57, made of the same material as shield 55, is disposed in mutually opposed relationship to shield 55 and carried from the outside of and below channel 16 via suitable clips and indexing blocks, not shown. The second magnetic shield 57 extends axially substantially the entire length of the C-field magnet 6. The upstanding legs of upper shield 55 and the lower shield 57 are disposed in overlapping relationship to completely surround the C-field magnet 6 with shielding members, thereby minimizing the amount of stray magnetic field extending into the C-field region whereby the homogeneity of the C-field is maintained.

A plurality of similar gimbal assemblies 61 (see FIGS. 7, 8 and 3) are employed for securing the oven 1, and state selector magnets 2 and 5 respectively, to the support channel 16. The gimbals 61 are made of a relatively heavy gauge material to provide a rigid support. The gimbal members are also provided with deformable wall portions such that the elements mounted to the gimball assembly may be changed in position for obtaining proper transverse alignment of the various elements after they have been mounted on the channel 16.

Referring now to FIGS. 7 and 8, the gimbal assembly 61 will be explained in greater detail. The gimbal mounting assembly 61 is formed by two substantially parallel plates 62 and 63 respectively, formed by punched parts techniques from 1/16 inch 304 stainless steel sheet stock.

Plate 62 forms a mounting bracket fixedly carried from the support channel 16 via a plurality of hold-down screws passing through suitable holes in a right angle turned under foot portions 60 of the bracket plate 62. The mounting plate 63 is supported from the bracket plate 62 via the intermediary of three equilaterally and equiangularly spaced axially directed rods 64 as of 1/4 inch diameter non-magnetic stainless steel. The rods 64 are anchored at both ends in plates 62 and 63, respectively via the intermediary of a plurality of thin-walled deformable diaphragms 65 brazed to the rods 64 and to the plates 62 and 63.

The diaphragms 65 are made of a thin gauge non-magnetic stainless steel as of 0.020 inch and 5/8 inch diameter and are provided with suitable convolutions in the diaphragm such that they may be flexed relative to the plane of the plates 62 and 63, respectively. By insertion of a suitable tool, not shown, within a pair of aligned apertures 66 in plates 62 and 63, respectively, and by insertion of screws into tapped holes 67 in bracket plate 62, the position of mounting plate 63 may be changed for transverse translation in the plane of the plate 63, for coating with respect to the plane of plate 62, and for axial translation. The gimbal assembly of FIGS. 7 and 8 allows as much as ±0.020 inch transverse translation of the mounting plate 63 relative to the fixed bracket plate 62.

In use, the gimbal assembly 61, via bracket plate 62, is fixedly mounted to the channel 16. A beam determining element such as, for example, the oven 1 is fixedly secured to the mounting plate 63. Precise alignment of the oven 1 is obtained by inserting the transverse aligning tool, not shown, and the screws into holes 66 and 67, respectively. Adjustments are made until the particular device such as the oven 1, carried from the mounting plate 63, is in proper alignment. In aligning the element, an overcorrection is preferably made and then the element on the mounting plate 63 is brought back to its proper position of alignment to relieve mechanical stresses in the diaphragm. With this method of alignment, it has been found that even after a severe thermal shock, as experienced during the bakeout cycle, relative positions of the parts and the desired alignment is well preserved.

The bakeable oven assembly is shown in FIG. 9. The oven 1 includes a main body portion 71 formed from a hollow rectangular copper block. A sealed ampule 72 is carried within a cylindrical bore in the block 71. The ampule 72 is filled with a desired amount of cesium or other material. The ampule 72 is held against an electrical perforator assembly 73, which closes off one end of the block 71. A centrally apertured vapor vent structure 74 is disposed substantially midway, lengthwise of the block 71. The hollow space between the vapor vent structure 74 and the electrical perforator assembly 73 defines a liquid cesium reservoir 75. After the tube has been processed the ampule 72 is perforated for escape of the cesium into the reservoir 75. A spring 70 as, for example, Inconel X is disposed in between the vapor vent structure 74 and the ampule 72 to assure that the ampule 72 is held in contact with the electrical perforator assembly 73.

The vapor vent structure 74 extends, in re-entrant fashion, into the interior of the reservoir 75 from one end thereof and includes an outer cone member 76. The re-entrant extent of the cone 76 is sufficient such that the opening in the free end of the cone 76, forming the vapor vent, is always above the liquid level to prevent escape of the liquid from the reservoir 75.

An axially directed gas communication passage 77 is placed in gas communication with the reservoir 74 via the vapor vent structure 74. The gas communication passage 77 terminates in chamber 78 containing a suitable beam collimator section 79. Two transverse bores, 81 and 82 are provided in the block 71 to receive therein thermal heating elements 83 and 84, respectively.

A thermistor assembly 85 is carried on the collimator end of the oven 1 and serves to control, by a suitable bridge assembly external of the tube, now shown, the electrical current supplied to the heating elements 83 and 84, respectively, and to maintain the oven at a desired predetermined temperature in the range of 60°–70° C. The bridge controls the temperature of the oven to at least 1/16° C. The ampule 72, electrical perforator assembly 73, vapor vent assembly 74, and the thermistor assembly 85 will be more fully described below.

In operation, the oven 1 is mounted on the receiving plate 63 of the gimbal mount assembly 61 in proper alignment with the tube. The tube envelope is then sealed and processed. When it is desired to place the tube in operation, the electrical ampule perforator 73 is energized, causing the ampule 72 to be opened and the cesium liquid to flow into the reservoir 75. The heating elements 83 and 84, respectively, maintain the oven 1 at the desired operating temperature of approximately 65° C. A certain amount of liquid cesium is evaporated from the reservoir 75 and enters the collimator 79 via vent 74, channel 77 and chamber 78. The cesium atoms then effuse through the collimator 79 to form the collimated beam of rectangular cross-section.

The bakeable ampule 72 is formed of a hollow cylindrical metal envelope 87. The material of the envelope is selected such that it does not react with the atomic beam material at elevated temperatures as required during the bakeout cycle. It has been found the previously used ampule materials of glass and copper chemically reacted with cesium, an alkali metal, at temperatures of about 300° C. causing the ceisum to leak from the ampule during the bakeout cycle. One suitable ampule material is 304 stainless steel. Other suitable materials include nickel and iron. Hollow cylinder 87 is necked down at the ends thereof and closed off at one end via transverse header 89, as of stainless steel suitably welded in position and centrally apertured for holding in gas tight relationship a tubulation 91, as of stainless steel, for filling the ampule 72 prior to loading of the ampule 72 into the oven 1. The fill tube 91 is suitably sealed after filling the ampule 72 by squeezing the tubulation flat and spot welding at the squeezed end to thereby provide a gas tight seal. A thin walled stainless steel diaphragm 93 as of, for example, 3 mil thickness closes off the other end of the ampule 72 and is sandwiched between annular headers 94 and 95 which in turn are welded across the neck of the ampule 72 to provide a seal thereacross.

Longitudinally directed ribs 96 are provided in the side wall of ampule 72 providing a fluid passageway therearound for escape of cesium liquid into the reservoir 75 after the diaphragm 93 has been ruptured. In a typical example of an ampule 72, the cylindrical envelope 87 is approximately 0.50 inch in diameter, of 0.030 inch wall thickness, and filled with a 0.5 gram charge of liquid cesium. The rate of cesium usage during tube operation is approximately $\frac{1}{20}$ of a gram per year such that the 0.5 gram charge should be sufficient to run the tube for many years.

The electrical ampule perforator 73 includes an axially directed pin 101 as, for example, molybdenum. The inner end of the pin 101 abuts the thin walled diaphragm 93 of the ampule 72 and is held in abutting relationship therewith by the spring 70. An annular flange 102, as of nickel, is sealed to the pin 101 via the intermediary of a hollow cylindrical insulator body 104 as of alumina ceramic. The flange 102 is provided with a central cylindrical sleeve 105 for abutting the insulator body 104. A second metallic flange 106 having an axially directed sleeve portion 107 is brazed to the insulator body at the other end thereof. Pin 101 forms an electrical terminal at 108 and is connected by a series capacitor 109 and switch 110 back to the conductive body 71 of the oven 1. The remaining portion of the electrical circuit back to the inner most end of the rod 101 is completed through the ampule 72 and the thin walled diaphragm 93 thereof. The capacitor 109 is made of relatively high capacitance value as of 800 microfarads and is charged, with switch 110 open, to a voltage of 350 volts.

In operation of the electrical perforator assembly 73, switch 110 is left open while the capacitor 109 is charged by a suitable D.C. voltage supply, not shown. When the capacitor 109 has been fully charged, the switch 110 is closed causing the capacitor 109 to discharge through the electrical circuit including the pin 101 and diaphragm 93. It has been found that the amount of electrical energy that is stored in the 350 volt 800 microfarad capacitor 109 is sufficient to vaporize a substantial opening in the 3 mil thickness stainless steel diaphragm 93 thereby opening the ampule 72. The capacitor 109 and switch 110 are disposed external of the vacuum envelope and leads pass into the envelope via suitable sealed terminals, not shown.

An alternative ampule perforator is shown in FIG. 10. The alternative perforator utilizes thermal expansion of a rod to actuate a pivoted lever to force a bifurcated knife through the thin walled diaphragm portion 93 of the ampule 72.

A cylindrical thermal expansion tube 112, as of ¼ inch I.D. 304 stainless steel contains therewithin, a suitable insulated thermal heating element 113 as of tantalum wire. Expansion tube 112 is fixedly secured to the mounting plate 63 of the gimbal mount 61 via the intermediary of a U-shaped channel member 114 as of stainless steel brazed to the bracket plate 62. The channel 114 captures the expansion tube 112 at one end of the expansion tube, designated at 115, via the intermediary of a suitable collar 116. The other end of the expansion tube 112 is free to expand or contract with the application of thermal energy to the tube 112. A punching lever 117 is pivoted about a pin 118 carried from channel 114. The free end of expansion tube 112 is captured by the lever arm 117. The other end of the punching lever 117 is brazed to the end of a bifurcated perforating knife 119.

A flexible diaphragm 121 interconnects the knife 119 and the inside walls of the oven housing 71 for sealing one end of the reservoir 75 to prevent leakage of cesium from the oven while permitting axial movement of the knife 119.

The cone shaped vapor vent assembly 74 will now be described in greater detail (see FIG. 9). The frustro-conical vapor vent structure 74 as of 403 Monel extends in re-entrant fashion, into the reservoir 75. The opening at the free, re-entrant end of the outer cone 76 is approximately $\frac{1}{16}$ inch in diameter and the cone is approximately 0.250 inch in length.

A vent cover 126 is formed from a thin metal disc as of nickel ⅛ inch in diameter. The cover 126 is held in position over the open end of vent cone 76 via a thin nickel wire 127 spot welded to the cone 76 and cover disc 126.

The cover disc 126 serves to block the flow of liquid directly into the entrance of the vapor vent cone 76 while not impeding the flow of vapor into the vent. The vent cone 76 has an axial extent sufficient to maintain the opening above the cesium liquid level for all possible orientations of the oven 1. The vent cone 76 has the advantage over an untapered vent in that it acts like a funnel for assisting flow of spilled liquid back into the reservoir 75.

A second cone-shaped vent 128 is nested within the first vent cone 76 and serves as an additional liquid trap while not substantially impeding the escape of vapor from the reservoir 75. Actually the second vent cone 128 greatly reduces the probability of liquid spillage since the probability of leakage past the two cones 76 and 128 varies as the product of the leakage probability of each of the cones. Therefore, if the probability of leakage through one cone is $\frac{1}{100}$ the probability of leakage with two nested cones is $\frac{1}{10,000}$. The second cone 128 is provided with a disc shaped cover plate 129 carried from cone 128 via a thin wire 131.

The bakeable thermistor assembly 85 will now be described in detail. A disc 135 of suitable thermistor material such as, for example, $K\Delta 31\omega 1$ material, made by Fenwal Electronics Inc. of Framingham, Massachusetts, is sandwiched between a pair of thin disc shaped electrodes 136 and 137 as of sheet nickel dimensioned, for example, 0.003 inch thick and 0.250 inch in diameter.

The thermistor assembly 85 is electrically isolated from the oven 1 via a thin sheet of mica insulation 138 as of 0.002 inch thickness.

The thermistor elements 135, 136, 137 and 138 are all held against the oven body 71 via the intermediary of a U-shaped spring 139 as of 304 stainless steel carried at its free ends from the oven block 71 by being slid within a pair of transverse grooves 141 on opposite sides of the block 71. The central portion of the spring 139 is provided with a re-entrant portion bearing against an insulator disc 140 as of alumina ceramic and holding the stack of thermistor elements against the oven block 71.

Electrical contact is made to the thermistor assembly 85 via leads 142 and 143 connected to discs 136 and 137.

The leads 142 and 143 extend out of the tube's vacuum envelope through suitable insulated feedthrough fittings, not shown.

The advantage of the bakeable thermistor assembly 85 is that with its disposition inside of the vacuum envelope, it is well isolated from changes in the ambient temperature environment, but is in relatively good thermal contact with the cesium oven body, whereby the beam intensity is rendered non-responsive to changes in the ambient.

After passing the central region C, the atoms enter the deflecting B-field produced by the magnet 5, which has already been described. Only those atoms which have undergone a transition to the (4,0) state proceed in the proper direction to strike the detector 7. The function of the detector 7 is to change the incident atoms into a signal that is useable.

This is accomplished by the ionizer-detector 7 illustrated in FIG. 11. The ionizer-detector 7 includes a chamber 151 having an opening 152 for entrance of the atomic beam. The beam enters the chamber 151 and passes through a slit 153 in a first plate 154 and strikes an ionizing ribbon 155 carried upon a second electrostatic plate 156 and insulated from the first plate 154 and the chamber 151 via insulators 157. The ionizing ribbon 155 is preferably a tungsten filament which has a long axis aligned with the major axis of the rectangular cross-sectioned beam of atoms. The width of the ionizing ribbon 155 is such that it will not be struck except by those atoms in that portion of the beam which have experienced the (4,0) energy transition.

The inoizing ribbon is a surface ionizer, that is neutral cesium particles strike the surface, are adsorbed, and are quickly emitted as singly charged positive ions. After ionization, the particles are accelerated to an energy of about 20 e.v. through the parallel plate system 154 and 156. At this energy the particles are deflected through a 60° angle by means of a mass spectrometer 158 and are subsequently accelerated by a parallel plate electrode 159 to enter a multistage electron multiplier 160.

The electron multiplier 160 produces an electrical output signal that is utilized in the servo system of the control circuits previously described with regard to FIG. 2. The output signal is derived from the electron multiplier 160 via leads, not shown, and taken through the vacuum envelope 17 via suitable insulated feedthrough terminals, not shown.

The mass spectrometer 158 is used to separate residual impurities in the source and the hot wire.

Suitable getter material and devices are strategically placed within the vacuum envelope for removing residual gas molecules and unused atomic beam material. More specifically, a bulk getter is formed by an antimony disc 161 (see FIG. 3) carried on the outside of the A-field shield 55 in alignment with the beam path. The disc 161 is centrally apertured for the passage of the beam therethrough and serves to getter unused beam material. Surface gettering is provided by a carbon coating applied to the inside of the domed envelope end hats 18 and 19, respectively, and to the surfaces of the magnetic shields 55 in the regions near the beam path. A suitable surface gettering material is formed by pulverized carbon suspended in a silicone binder and applied via an alcohol vehicle. Such a material is known as dispersion number 154 made by Acheson Colloids Company of Michigan. The beam tube construction used herein wherein the beam determining elements are surrounded by a separate vacuum envelope lends itself to this type of surface gettering since large surface areas are provided internal of the vacuum envelope for application of the getter material.

The atomic beam tube apparatus, previously described, is not limited to the cesium atom alone. Certain isotopes of other alkali metals such as, for example, thallium and rubidium may be used. Any electron re-orientation transition in atoms or molecules for which the net atomic or molecules angular momentum $f$, is an integer in quantum units of $h$ may be used. In general, it is contemplated that any molecular or atomic beam having desired transition characteristics may be used and the term "atomic beam" as used herein is not intended to be limited to a beam of cesium atoms.

Since many changes can be made in the above construction and many apparently widely different embodiments of this invention could be made without departnig from the scope thereof, it is intended that all matter contained in the above description or shown in the accompanying drawings shall be interpreted as illustrative and not in a limiting sense.

What is claimed is:

1. In an atomic beam tube apparatus including; a source of beam particles for forming and projecting a beam of atomic particles over a predetermined beam path, a detector disposed at the terminal end of the beam path for detecting resonance of the beam particles, state selector magnets disposed along the beam path for deflecting beam particles, means for applying microwave radiation to the beam between said state selector magnets for effecting resonance of the beam particles; an elongated rigid support structure directed along the beam path and fixedly supporting said source, detector, and state selector magnets in alignment; a separate evacuated envelope structure enclosing said support structure; suspension structure disposed between said support structure and said envelope structure for suspending said support structure from said envelope structure; said suspension structure including, means providing a pair of axially spaced apart radial and torsional restraints for said suspended support structure, and means providing an axial restraint for said support structure independent of at least one of said pair of spaced radial and torsional restraint means; whereby distortion of said support structure which is encountered when the vacuum envelope is mechanically deformed during bakeout is minimized.

2. The apparatus according to claim 1 wherein said axial restraint means applies the axial restraint to said support structure between the points of application of said spaced radial and torsional restraints.

3. The apparatus according to claim 1 wherein said means for applying the axial restraint to said support structure includes a diaphragm disposed with the plane of the diaphragm substantially paralleling the major axis of the elongated support structure.

4. The apparatus according to claim 3 wherein said diaphragm is apertured to form a passageway for passage of a microwave radiation generating means therethrough for applying the microwave radiation to the beam.

5. In an atomic beam tube apparatus including, a source for projecting a beam of atomic particles over a predetermined path, a detector disposed along the path, a vacuum envelope to enclose the beam of atomic particles between said source and said detector, means for applying microwave radiation to the beam particles in a region intermediate said source and said detector to define a resonance region in the beam path, an elongated magnet structure U-shaped in section and partly surrounding the beam path in the resonance region, an elongated support structure paralleling the beam path in the resonance region, spring biased fasteners for fastening said U-shaped magnet structure to said support structure, a pair of indexing means spaced apart in the direction of the beam for transversely aligning said elongated magnet with respect to the beam path while permitting relative axial movement between said elongated support structure and said elongated magnet, whereby said magnet is free to expand and contract under severe thermal shock without introducing undesired stress produced degradation of said U-shaped magnet performance properties.

6. The apparatus according to claim 5 wherein said indexing means includes, index blocks carried from one of said fastened magnet and support structures and disposed in cooperative engagement with notches formed in the other of said fastened magnet and support structures.

7. The apparatus according to claim 6 wherein said indexing blocks are carried from the elongated support structure and said notches are formed in the free edges of said U-shaped magnet.

8. In an atomic beam tube apparatus including; means for forming a source of atomic particles and for projecting the particles into a beam; means forming a detector of atomic particles disposed along the beam path; means for generating an inhomogeneous magnetic field in the beam path intermediate said source means and said detector means; an elongated support structure directed along the beam path; and a gimbal mounting structure for fixedly mounting one of said aforementioned source and magnetic field generating means from said elongated support structure; said gimbal mounting structure including, a first member rigidly connected to said support structure, a second member spaced apart from said first member and rigidly holding one of said aforementioned means in alignment with the beam, a plurality of spaced apart third members interconnecting said first and second members, and said third members being interconnected to both said first and second members via the intermediary of localized deformable portions formed on both of said first and second members, whereby said mounted means is aligned relative to a predetermined beam path by deformation of said deformable portions the alignment being preserved in moderate to severe environment.

9. The apparatus according to claim 8 wherein said third members are rods, and said deformable portions are thin diaphragms.

10. The apparatus according to claim 9 wherein there are three rods interconnecting said first and second members and forming said third members.

References Cited

UNITED STATES PATENTS

| | | | |
|---|---|---|---|
| 2,570,121 | 10/1951 | Harbaugh | 313—46 |
| 2,821,662 | 1/1958 | Bell et al. | 313—63 X |
| 2,824,967 | 2/1958 | Kamen | 250—41.9 |
| 2,960,302 | 11/1960 | Brown | 248—358 |
| 2,961,558 | 11/1960 | Luce et al. | 313—63 |
| 2,972,115 | 2/1961 | Zacharias et al. | 331—3 |
| 3,060,385 | 10/1962 | Lipps et al. | 331—3 |
| 3,096,456 | 7/1963 | Shelton et al. | 313—63 |
| 3,131,903 | 5/1964 | Quick | 248—358 |

RALPH G. NILSON, *Primary Examiner.*

ROBERT SEGAL, *Examiner.*

W. F. LINDQUIST, *Assistant Examiner.*